June 18, 1968  M. L. CROALL ET AL  3,388,528
ENCAPSULATING AND LOADING APPARATUS
Filed July 19, 1965  8 Sheets-Sheet 1
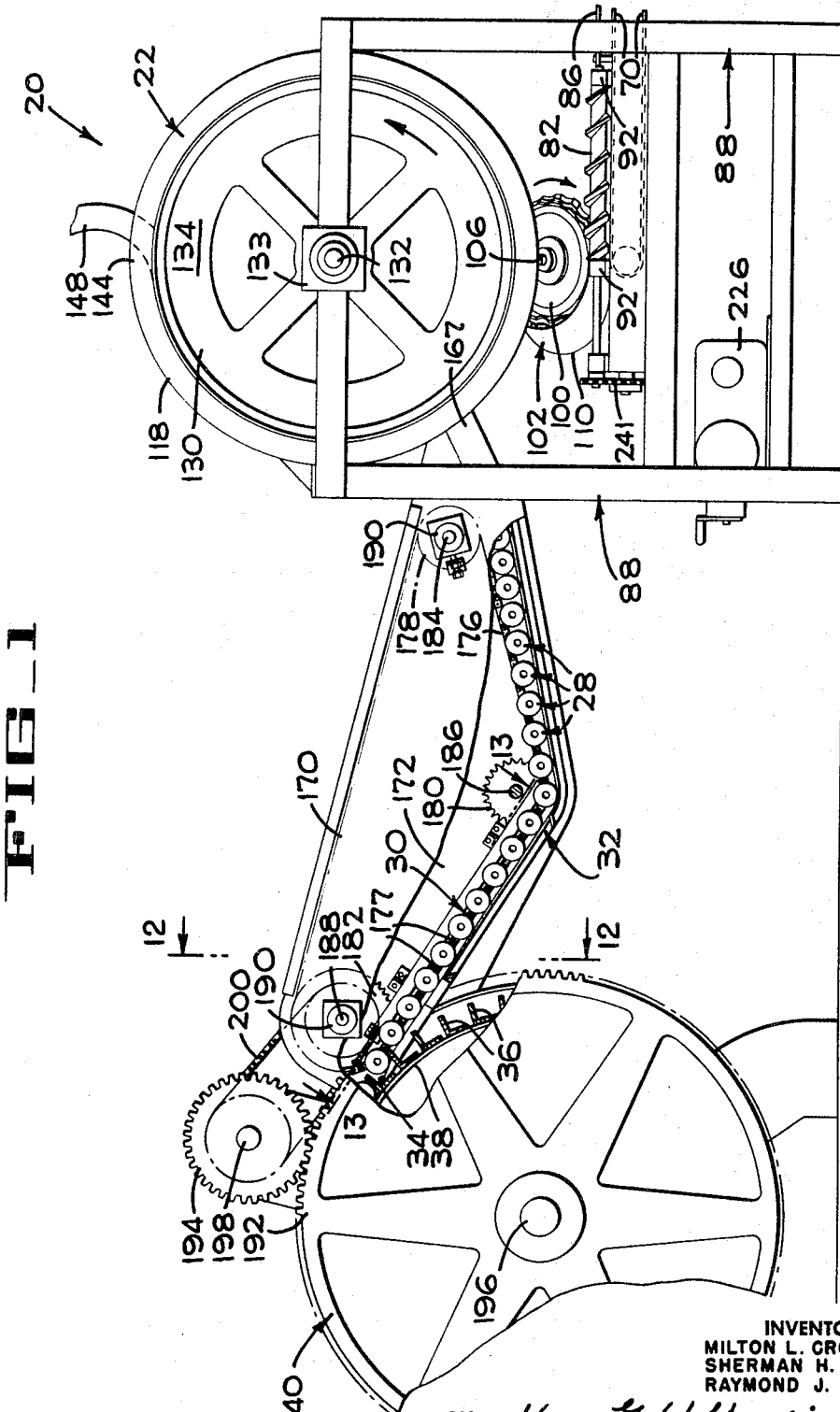
FIG_1
INVENTORS
MILTON L. CROALL
SHERMAN H. CREED
RAYMOND J. BELL
BY Hans G. Hofmeister
ATTORNEY

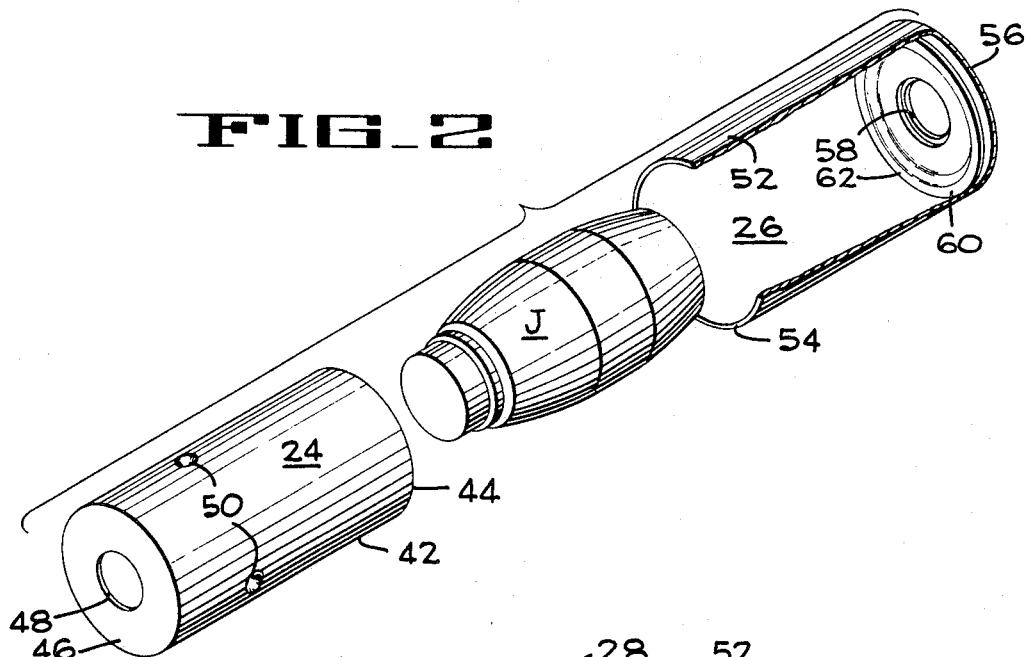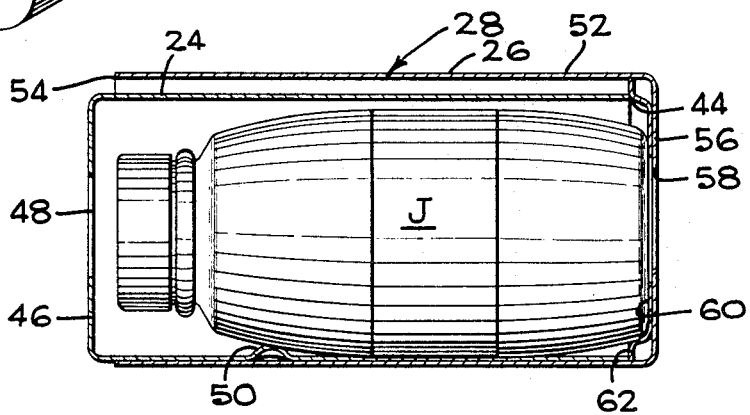

June 18, 1968 M. L. CROALL ET AL 3,388,528
ENCAPSULATING AND LOADING APPARATUS
Filed July 19, 1965 8 Sheets-Sheet 3
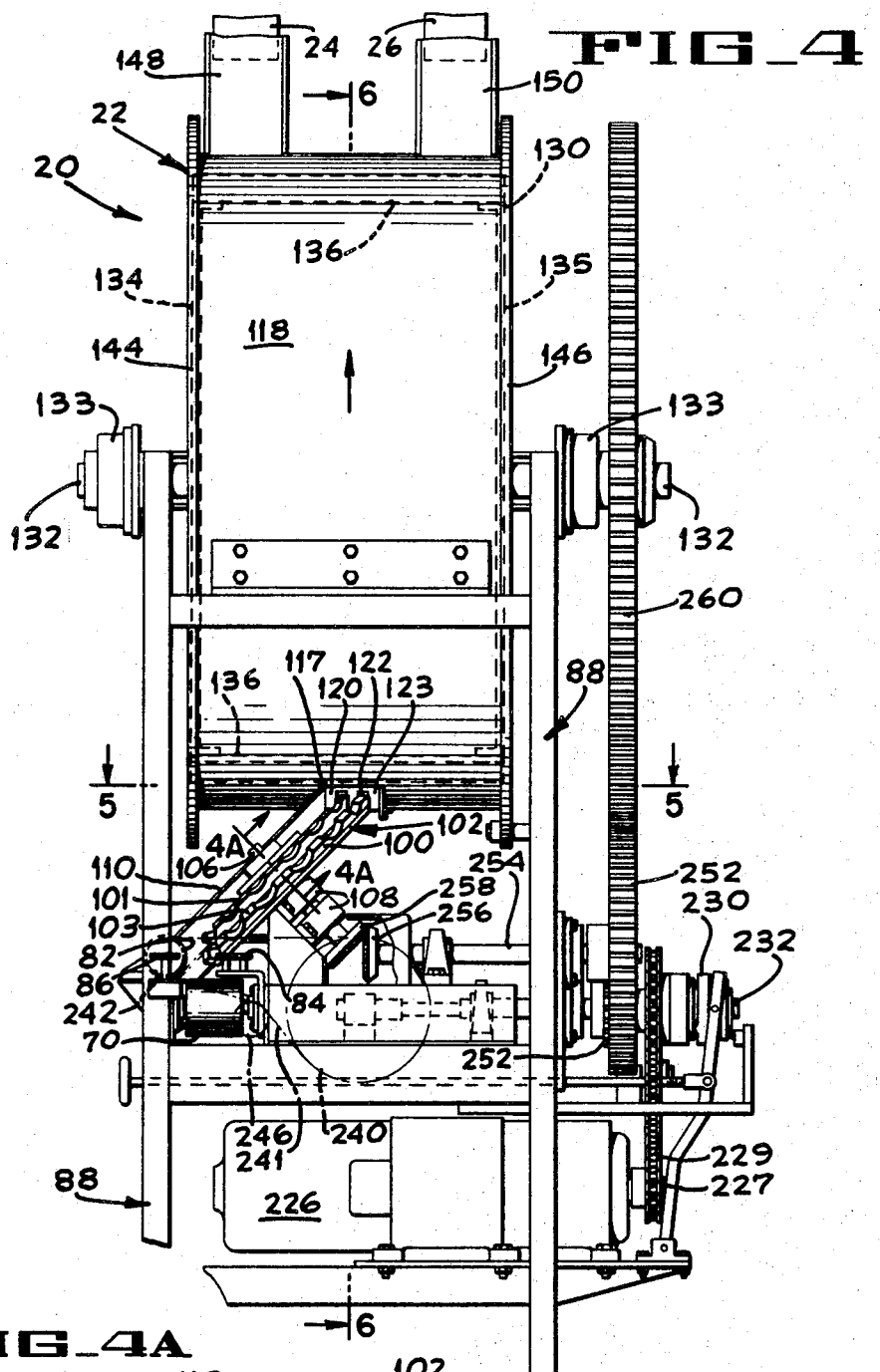
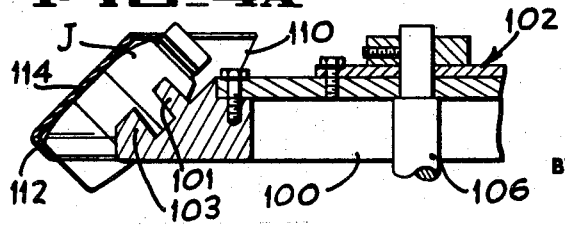
INVENTORS
MILTON L. CROALL
SHERMAN H. CREED
RAYMOND J. BELL
BY Hans G. Hoffmeister
ATTORNEY

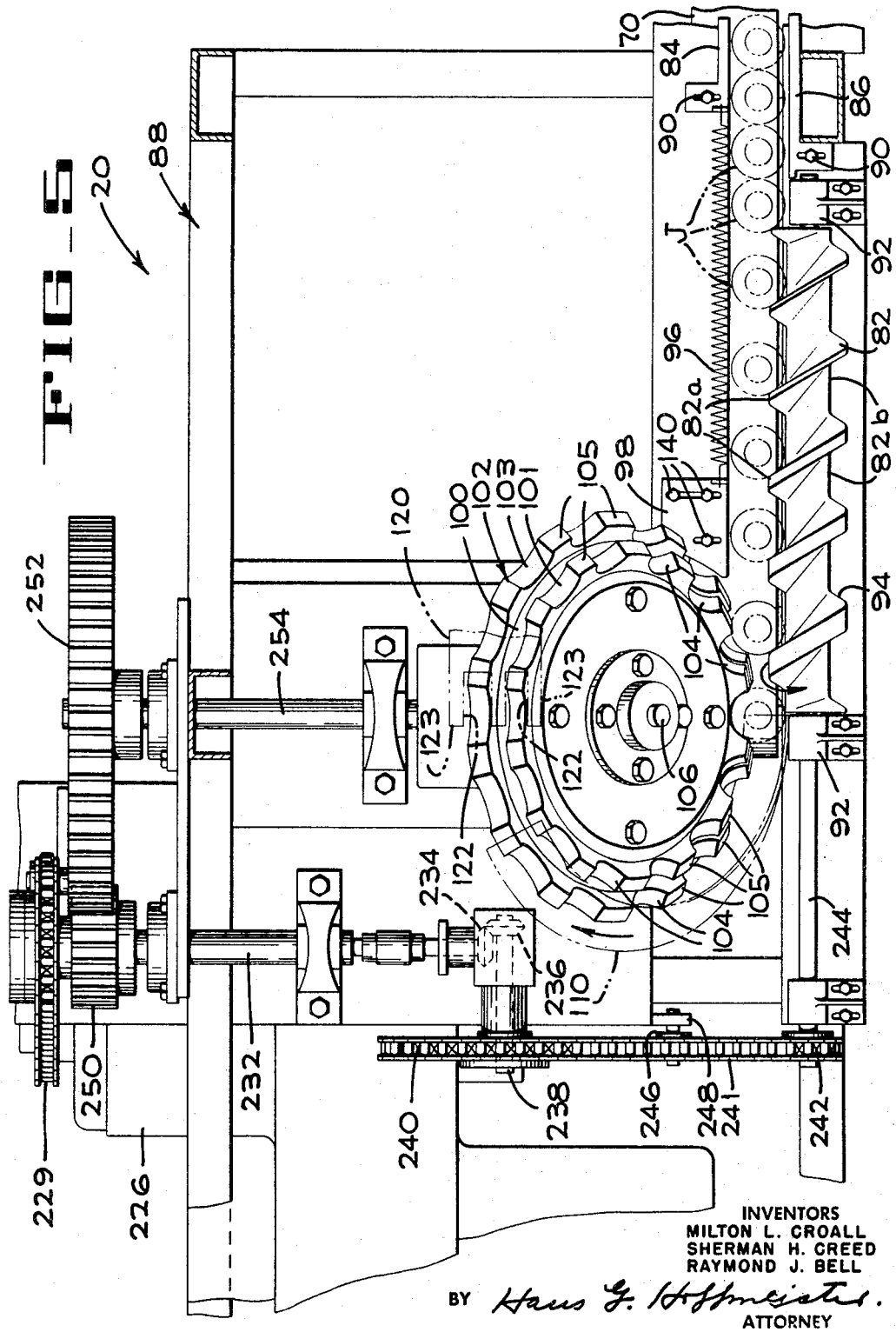

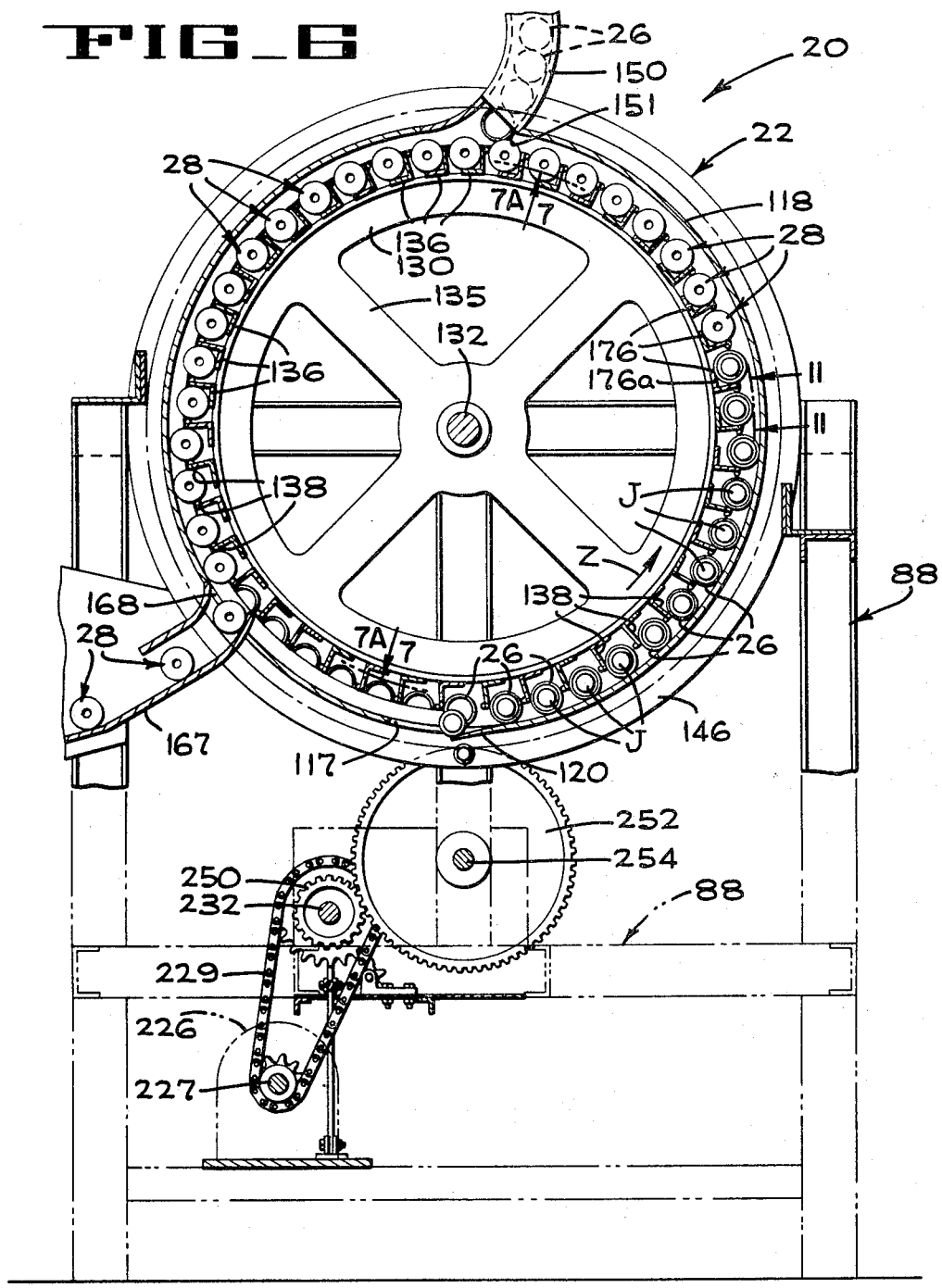

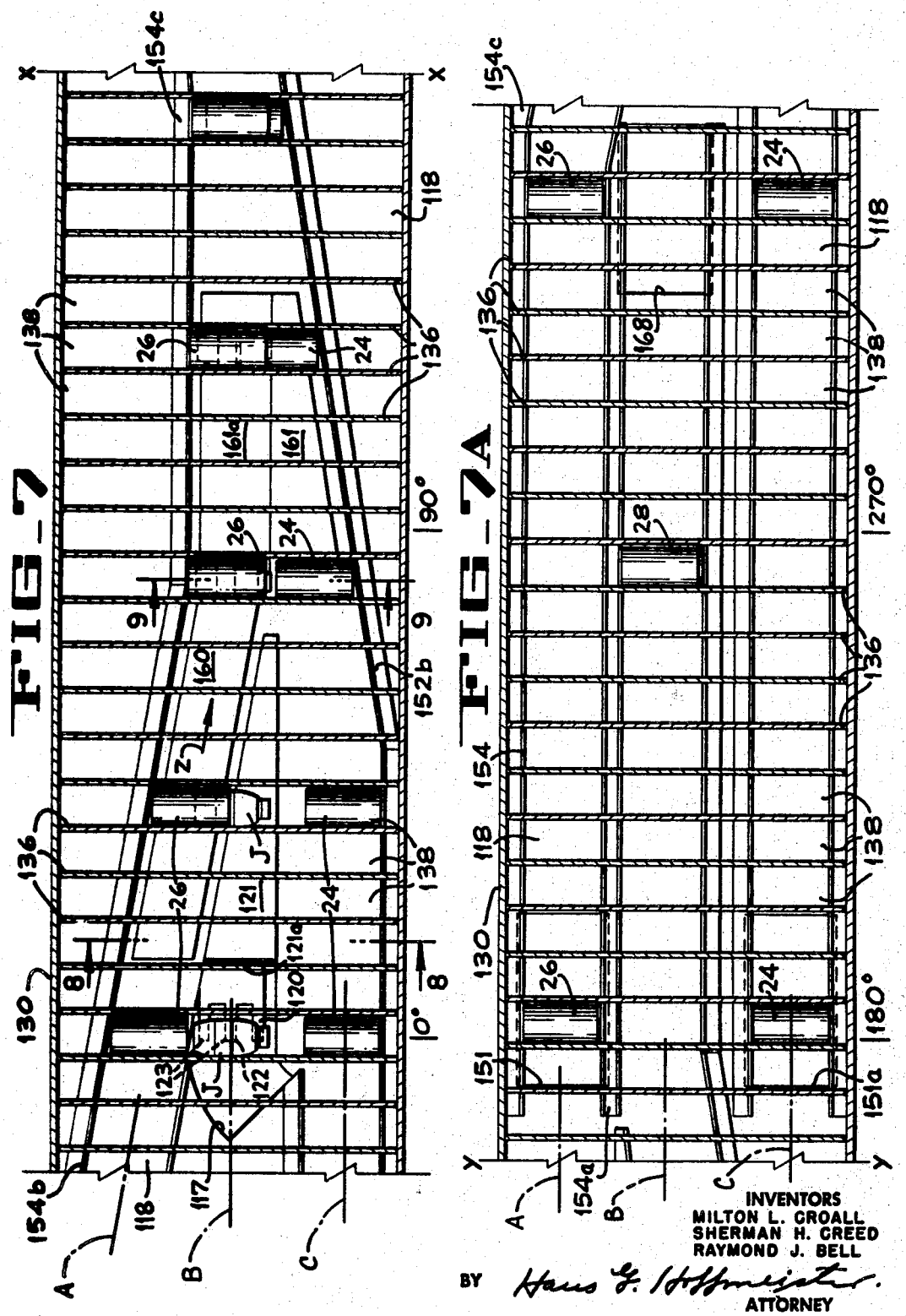

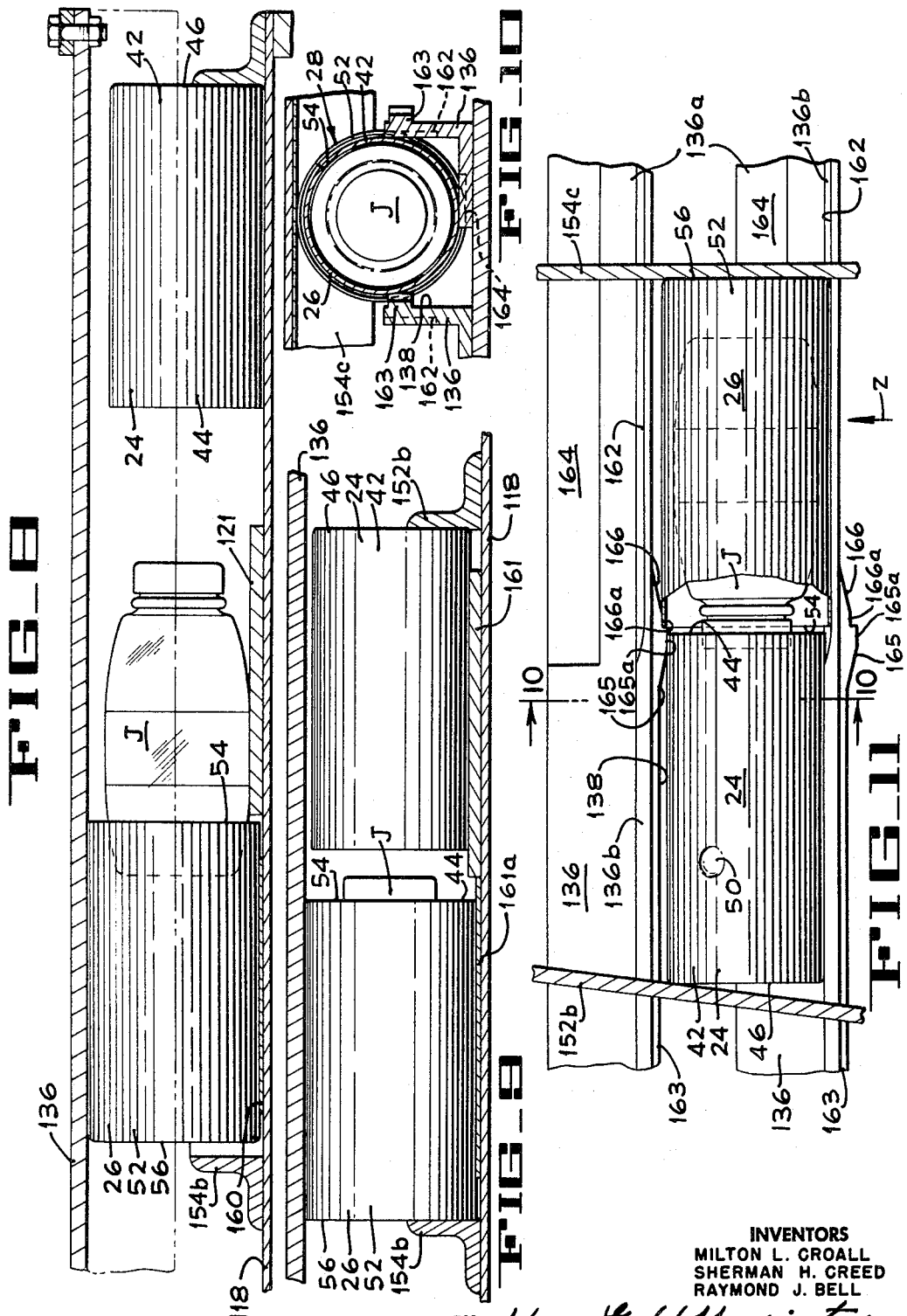

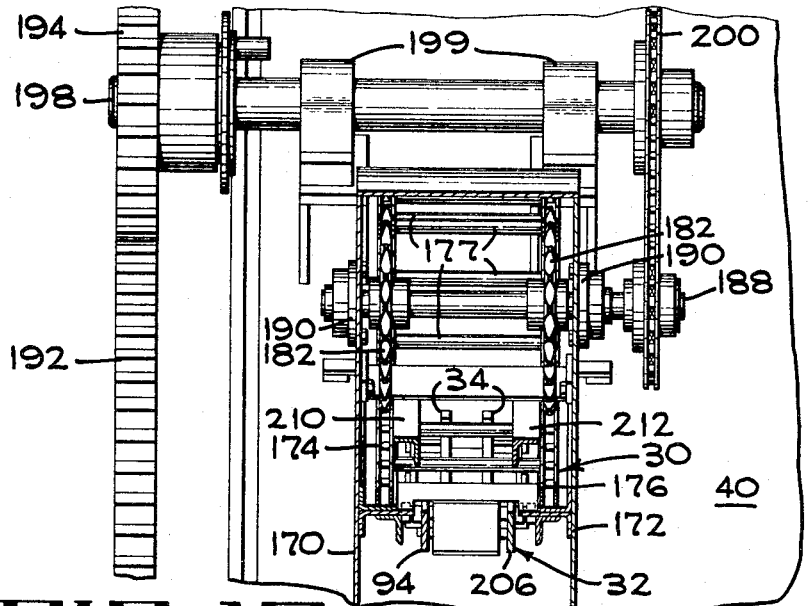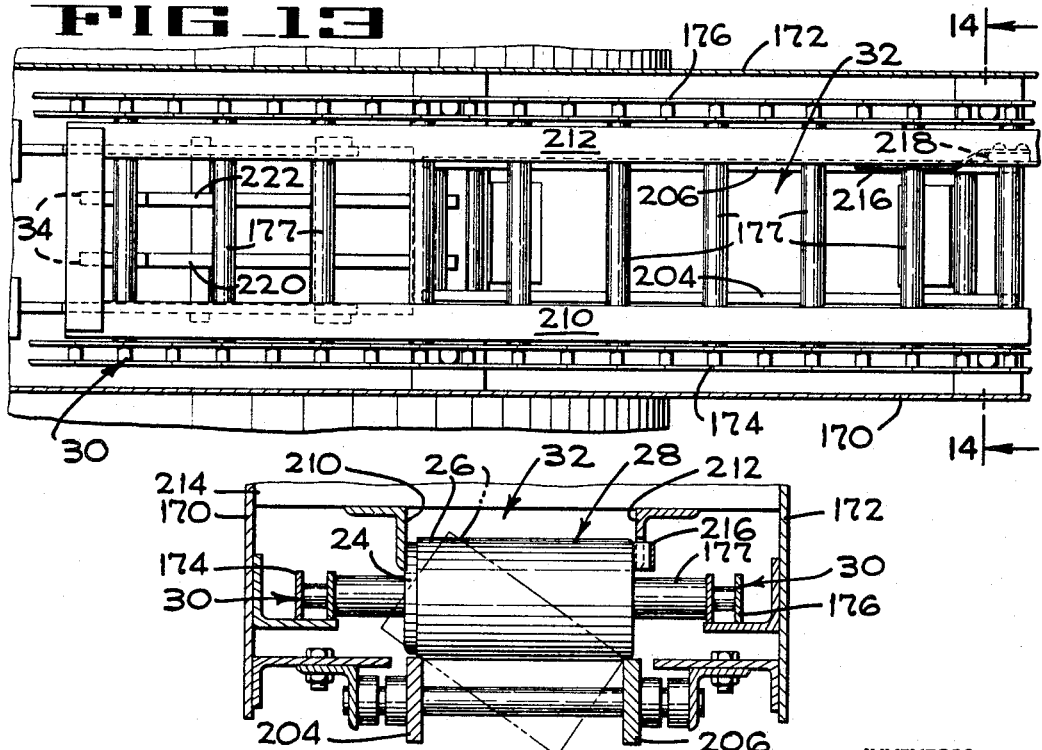

United States Patent Office 3,388,528
Patented June 18, 1968

3,388,528
ENCAPSULATING AND LOADING APPARATUS
Milton L. Croall, Los Gatos, and Sherman H. Creed and Raymond J. Bell, San Jose, Calif., assignors to FMC Corporation, San Jose, Calif., a corporation of Delaware
Filed July 19, 1965, Ser. No. 472,969
9 Claims. (Cl. 53—253)

ABSTRACT OF THE DISCLOSURE

An apparatus for encapsulating a container in a capsule defined by a tubular cartridge and carrier each having one end open to accommodate a container and one end closed to container passage. The apparatus includes a driven reel having elongated guide tracks for receiving the cartridge, carrier and container with the container disposed between the cartridge and the carrier. Guide rails are provided to move the cartridge and the carrier into telescoping engagement with the container, and cam means are provided and are responsive to the axial movement of the cartridge and carrier to assure alignment of the cartridge with the carrier. The apparatus additionally includes means for spacing the containers an equal distance apart and for shifting the containers between a vertical and a horizontal position before entry into the elongated guide tracks.

---

The present invention pertains to an apparatus for encapsulating articles such as glass jars and for thereafter loading the encapsulated jars into heat treatment apparatus.

When handling articles such as glass jars in heat treatment apparatus, a certain amount of glass breakage always occurs due to defective jars whose defects are aggravated by mechanical or thermal shock. Although this breakage may be relatively minor, when jars are handled in well known reel and spiral heat treatment apparatus, broken jars will build up along the floor of the apparatus and will interfere with unbroken jars moving through the apparatus, thereby causing still greater breakage.

In order to overcome the above disadvantages of handling glass jars in reel and spiral cookers, it has been conceived that the jars be individually confined or encapsulated in telescoping capsules, and remain confined in the capsules until after the jars, broken or intact, have been removed from the heat treatment apparatus.

The broad concept of encapsulating containers for movement through heat treatment apparatus has been described and claimed in the application of Allison E. Pech for United States Letters Patent filed on even date herewith and having Ser. No. 473,107. The apparatus of the present invention is identical to corresponding apparatus in said Pech application which is incorporated by reference herein.

The claims covering the apparatus disclosed in the present application are limited to the specific apparatus for encapsulating the containers and for loading the encapsulated containers into the heat treatment apparatus. The heat treatment apparatus may be of the type disclosed in United States Patent No. 2,536,115 which issued to Paul C. Wilbur on Jan. 2, 1951.

Accordingly, it is an object of the present invention to provide an apparatus for individually confining articles in capsules.

Another object is to provide an apparatus for encapsulating jars and for loading the encapsulated jars into a heat treatment apparatus.

Another object is to provide an improved conveyor for receiving a row of abutting containers and for spacing the containers an equal distance from each other.

Another object is to provide apparatus for transferring containers from a position wherein their axes are vertical to a position wherein their axes are horizontal while reversing the direction of movement of the containers.

Another object is to provide an apparatus for accurately aligning a cartridge and a carrier and for moving the cartridge and carrier into telescoping engagement with an article.

Another object is to provide apparatus for rejecting improperly formed capsules.

Another object is to provide apparatus for gently lowering encapsulated jars into the carrier bars of a reel and spiral heat treatment apparatus.

These and other objects and advantages of the present invention will become apparent from the following description and accompanying drawings, in which:

FIGURE 1 is an end elevation, with parts broken away illustrating the capsule loader of the present invention and the mechanism for feeding the loaded capsules into a reel and spiral heat treatment apparatus.

FIGURE 2 is an enlarged, exploded perspective, partly broken away, illustrating the position of a jar relative to a cartridge and carrier prior to being encapsulated within the cartridge and carrier.

FIGURE 3 is a vertical central section through a telescoping capsule formed by the cartridge and carrier, illustrating the manner in which a jar is confined therein.

FIGURE 4 is an enlarged front elevation of the capsule loader of FIGURE 1.

FIGURE 4A is an enlarged fragmentary section taken on lines 4A—4A of FIGURE 4.

FIGURE 5 is a horizontal section taken along lines 5—5 of FIGURE 4.

FIGURE 6 is a vertical section taken along lines 6—6 of FIGURE 4.

FIGURES 7 and 7A are arcuate sections forming a diagrammatic developed view of the inner surface of the shell of the capsule loader, FIGURE 7 being taken along lines 7—7 of FIGURE 6 and FIGURE 7A being taken along line 7A—7A, and the sections being arranged so that when the sections are placed end-to-end with the line $x$—$x$ of FIGURE 7 overlying line $y$—$y$ of FIGURE 7A the complete view of the inner surface is formed.

FIGURES 8, 9 and 10 are enlarged diagrammatic vertical sections taken along lines 8—8 and 9—9 of FIGURE 7, and 10—10 of FIGURE 11.

FIGURE 11 is a vertical section taken along lines 11—11 of FIGURE 6, illustrating a cartridge and carrier aligning device.

FIGURE 12 is an enlarged vertical section taken along lines 12—12 of FIGURE 1.

FIGURE 13 is an enlarged horizontal section taken along lines 13—13 of FIGURE 1 illustrating a reject mechanism and a capsule let-down device.

FIGURE 14 is an enlarged section taken along lines 14—14 of FIGURE 13 illustrating the manner of rejecting an improperly formed capsule.

In general, the container encapsulating and loading apparatus 20 (FIGS. 1 to 4) of the present invention is adapted to handle glass jars J that are filled with a product such as milk and closed and capped prior to being introduced into a capsule loader 22 of the apparatus 20. As indicated in FIG. 2, each jar is advanced into the capsule loader 22 to a position between a cartridge 24 and a carrier 26 which have already been moved into the loader 22. As the jar J, cartridge 24, and carrier 26 are advanced through the capsule loader 22, they are accurately aligned and are urged together to provide a closed capsule 28 with the jar positively confined or encapsulated therein as indicated in FIGURE 3. The capsule 28 with the container therein is then discharged from the capsule loader 22 and is moved by a timing and spacing conveyor 30 over a reject mechanism 32 which permits passage of properly formed capsules but rejects capsules which are improperly formed, i.e., a carrier without a cartridge or a cartridge without a carrier. The properly formed capsules 28 are then advanced over let-down fingers 34 into carriers bars 36 of the continuously driven reel 38 of a heat treatment apparatus 40.

An important feature of the invention is that the jars J are each individually confined within a capsule 28 of a size and shape which may be reliably handled by the heat treatment apparatus 40. By confining an individual jar in each capsule, any defective jars which are broken by a thermal or mechanical shock are retained in the associated capsules 28 until after the capsules have been moved completely through the treatment apparatus 40.

The capsule 28 illustrated in FIGURES 2 and 3 comprises the cartridge 24 and the carrier 26 both of which are formed of a ferrous metal which may be magnetically attracted. The cartridge 24 includes a cylindrical body 42 which is slightly larger in diameter than the jars J being processed, and which has one open end 44 through which the jar is inserted. The other end of the cartridge 24 is partially closed by an end plate 46 which is formed integrally with the body 42 and has an opening 48 therein to permit the heat treating medium to enter the capsule 28. Dimples 50 are formed in the cylindrical body 42 near the end plate 46 to project inwardly and engage the the jar and act as a stop which prevents the cap of the jar from contacting the end plate 46. If such contact were permitted, lithography on the jar caps could be damaged by engagement with the end plate 46.

The carrier 26 of each capsule 28 is similar in appearance to the cartridge 24 and includes a cylindrical body 52 of a slightly greater diameter than the body 42. The body 52 has an open end 54, which receives the cartridge 24, and a partially closed end defined by a plate 56 integral with the body and having an opening 58 therein. In order to minimize magnetic attraction between the open end 44 of the cartridge and the end plate 56 of the carrier when the end plate 56 is subjected to a magnetic force, an apertured dish 60 of nonmagnetic material is rigidly secured to the inside surface of the end plate 56 and includes an annular flange 62 spaced from the plate 56 which substantially eliminates any magnetic force tending to pull the carrier and cartridge toward each other.

The capsule loader 22 (FIGS. 1 and 4) receives filled and capped jars J from a feed conveyor 70 and positions a carrier 26 over each jar. Then the loader telescopes a cartridge 24 into the carrier 26 between the carrier and the jar, whereby the jar is then enclosed in a capsule 28. The loaded capsules are then moved by the timing conveyor 30 (FIG. 1) over the reject mechanism 32 which causes incomplete capsules to drop out of the timing conveyor allowing only properly assembled capsules to move over the let-down fingers 34 into the heat treatment apparatus 40.

As best shown in the plan view of FIGURE 5, filled jars are received in upright position and in random order on the feed conveyor 70, which may be of the endless belt type and is continuously driven by drive means, such as a motor, not shown. As the jars move along the feed conveyor 70, they are guided into a screw type spacing conveyor 82 by guide rails 84 and 86 (FIG. 5), which rails are secured to the frame 88 of the capsule loader 22 by bolts 90 that extend through slots in the rails and permit transverse adjustment of the rails to accommodate jars of different sizes. The spacing conveyor 82 is journalled in bearings 92 which are secured to the frame for transverse adjustment. The pitch of the screw thread 94 of the spacing conveyor gradually increases in the direction of movement of the jars thereby spacing the randomly spaced jars a predetermined distance from each other as they reach the discharge end of the screw conveyor 82.

A resilient guide rail in the form of a spring 96 is stretched between the rail 84 and a rail segment 98 that is adjustably secured to the frame near the discharge end of the screw conveyor 82. The spring 96 provides a resilient guiding surface which is disposed opposite the inlet end of the screw conveyor and will deflect in the event a jar should engage a ridge 82a of a portion of a screw conveyor 82, as it enters the conveyor, rather than being disposed in the valleys 82b between adjacent ridge portions of the screw thread 94. The resistance to forward movement of the jar by the spring 96 will cause such a mis-positioned jar to be forced into the next adjacent valley 82b as the jar moves to the left in FIG. 5.

The screw conveyor 82 is driven slower than the feed conveyor 70 and in timed relation with a transfer turret 102 which consists of an annular member 100 that is secured to a shaft 106 and has two rings 101 and 103 integrally formed around its periphery. Pockets 104 are provided in the rings 101 and 103 by fingers 105, the pockets being spaced apart a distance equal to the distance between jars at the discharge end of the screw conveyor 82. The shaft 106 is inclined and is journalled in bearings 108 bolted to the frame of the capsule loader 22.

The provision of the two rings 101 and 103 make it possible to handle both tall and short jars in the turret 102 without requiring any alterations to the turret. When tall jars are to be handled, the jars are supported by both rings and when short jars are being handled, the lower ring 103 operates alone and provides sufficient jar-supporting surface to prevent twisting or turning of the jar in the pocket while the jar is moved from a vertical to a horizontal position by the turret. A stationary, curved track 110 (FIGS. 4 and 4A) is secured to the frame 88 and includes a bottom-engaging section 112 and a side-engaging section 114 which cooperate to retain the jars in their pockets 104 as the jars are moved from the vertical to the horizontal position.

While moving the jars to a horizontal position, the transfer turret 102 moves the jars upwardly through an opening 117 (FIGS. 6 and 7) on the lower side of a stationary drum or shell 118 (FIGS. 4 and 6) which forms the outer shell of the capsule loader 22. While in the drum 118, the carriers 26 and cartridges 24 are moved into telescoping engagement over the jars to confine each jar in one of the capsules 28.

The jars are transferred one at a time from the turret 102 (FIG. 4) onto an arcuate stripper plate 120 which is formed integrally with the shell 118 adjacent the opening 117. The outer or free end of the stripper plate 120 is provided with slots 122 (FIG. 5) defining fingers 123 which extend into the spaces alongside and between the rings 101 and 103 to intercept and strip each jar from the transfer turret. Immediately inside the opening 117, a jar support and spacer plate 121 (FIG. 6) is secured to the inside wall of shell 118. This plate 121 may have a tapered leading edge 121a for guiding each jar up onto the plate which is of a thickness adapted to maintain the jar in slightly spaced relation to the inner wall of the shell so that the carriers can easily be telescoped at a subsequent station around the jar without danger of the bottom of the jar engaging the open end of the carrier as will be explained in more detail hereinafter.

As best shown in FIG. 6, a continuously driven combiner reel 130 is disposed within and is concentric with the shell 118. The reel is mounted on a shaft 132 which is journalled in bearings 133 (FIG. 4) secured to the frame 88 of the capsule loader. The reel 130 includes a pair of spaced wheels 134 and 135 which are keyed to the shaft and have a plurality of equally spaced angle carrier bars 136 (FIG. 6) secured to the outer periphery of each wheel. The angle bars are spaced sufficiently from each other and from the undersurface of the drum 118 (FIGS. 8–11) so that jars J, cartridges 24 and carriers 26, which are fed into pockets 138 defined between adjacent angle bars, will be advanced along the inner surface of the drum 118 upon rotation of the reel 130. As best shown in FIG. 4, the ends of the shell 118 are secured to side plates 144 and 146 which are apertured to receive the reel shaft 132.

The empty carriers 26 are received from the carrier conveyor (not shown) and are directed into a chute 150 (FIG. 4) which communicates with an opening 151 (FIG. 6) in the shell and guides the carriers 26 through the opening into the reel pockets 138. The empty cartridges 24 are received from another conveyor (not shown) and are similarly directed through a chute 148 (FIG. 4) which is identical to chute 150 and is arranged to guide the cartridges 24 through an opening 151a (FIG. 7A) in the shell and into the reel pockets 138.

Referring to FIGS. 7 and 7A, it will be noted that, when these views are placed end-to-end with transverse line x—x of FIG. 7 overlying line y—y of FIG. 7A, a developed diagrammatic view of the entire inner surface of the shell 118 is provided, the plane of this view being indicated by the circular section lines 7—7 and 7A—7A, respectively, of FIG. 6. Various operations take place as the jars, carriers, and cartridges are moved around the inside of the shell and, in order to locate the positions at which these operations take place, angular positions around the stationary shell have been indicated on FIGS. 7 and 7A. The zero degree position has been chosen to be the lowermost section of the shell at the area of the opening 117. Accordingly, by referring to FIG. 6 and FIG. 7A it will be recognized that the chutes 148 and 150 through which the carriers and cartridges enter the shell are at approximately the 180 degree, or uppermost area of the shell.

In general, three paths A, B and C (FIGS. 7 and 7A) are defined on the inner periphery of the shell, these paths being indicated by centerlines. The entrance opening 117 is located along the central path B and, accordingly, each jar is placed in the central portion of one of the reel pockets and remains in this central position while it is being encapsulated and finally discharged. The opening 151 (FIG. 7A) through which the carriers 26 enter the shell is disposed along path A and, accordingly, the carriers 26 enter the shell at a point 180 degrees from the point of entry of the jars and at a point spaced laterally from the central path B. As will be explained presently, the carriers 26 do not remain in path A but are eventually cammed over to path B. Similarly, since the opening 151a (FIG. 7A) through which the cartridges 24 enter the shell is disposed along path C, the cartridges enter the machine at a point spaced laterally from the central path B and are cammed over to path B to encircle a jar and telescope inside the carrier 26 that has been already positioned around the jar.

Referring to FIG. 7A, it will be seen that each carrier 26 enters the shell through opening 151 and is moved to the right along path A by an angle bar 136. During the initial portion of its movement downwardly along the inner surface of the shell, the carrier is confined to movement along path A by two longitudinally extending guide rails 154 and 154a. At approximately the 340° section of the shell, one edge of the carrier engages an inwardly slanted rail 154b which guides the carrier inwardly toward path B. After the carrier passes the 0°–360° section (FIG. 7), it is moved to approximately the 12° section where it rides up onto a relatively thin plate 160 that is secured to the inner face of the shell and extends to approximately the 130° section. The inwardly slanted guide 154b ends before the 90° section is reached and a straight, longitudinally extending guide bar 154c forms a continuation of rail 154b to guide the carrier in a straight line as it is moved along path B.

It will be noted in FIG. 7 that, as each carrier bar 136 approaches the 90° section of the shell, the cartridge 24 contacts a plate 161 secured to the inner wall of the shell and the carrier continues on a portion 161a of plate 160, which is thin relative to plate 161, as seen in FIG. 9. These plates urge the cartridge and carrier radially inwardly of the drum so that, as they pass the 90° section, they roll inwardly (FIG. 6) into contact with the upstanding leg 136a of the carrier bar 136. At this time, an inclined guide rail 152b (FIG. 7) has not as yet telescoped the cartridge into the adjacent carrier. In order to position the open end of the cartridge for telescoping movement into the carrier, each carrier bar 136 (FIG. 11) is provided with an aligning mechanism comprising a guide strip 163 welded to the rear face of the leg 136b, a recess 164 in the leg 136a, and a recess 162 in the capsule supporting leg 136b. The guide strip 163 has a slanted surface 165 leading to a flat surface 165a, and a slanted surface 166 leading to a recess 166a. As seen in FIG. 11, when the carrier 26 with the jar therein is being moved upwardly in the general direction of arrow Z toward the 90° section of the shell, it rests in the recess 162 of the carrier bar and has been urged by the adjacent guide bar 154c into the recess 166a of the guide strip 163 on the rear wall of the carrier bar next ahead. Similarly, the cartridge 24 rests on the leg 136b of the carrier bar and has been urged inwardly by guide bar 152b until it is in abutting engagement with the surface 165a. As the carrier engages the thin plate 161, it is urged inwardly into the recess 164 of leg 136a. Thus, as seen in FIG. 10, after the cartridge and carrier pass the 90° section, they are in alignment such that the cartridge 24 can telescope into the carrier under the further urging of the guide bar 152b (FIG. 7). The telescoping operation continues until the cartridge and carrier reach approximately the 170° section of the shell. As the telescoped unit continues around the shell along the path B, it moves downwardly (FIG. 6) and is finally discharged through an opening 168 in the shell.

The telescoped units, which will hereinafter be referred to as capsules, gravitate from the opening along an inclined support plate 167 (FIG. 1) which forms the floor of a portion of the roller timing conveyor 30 which includes a pair of spaced vertical mounting plates 170 and 172 (FIGS. 1, 12, 13 and 14). One end of each mounting plate is secured to the frame 88 while the other end is secured to the heat treatment apparatus 40 adjacent the feed opening thereof. The timing conveyor 30 comprises a pair of spaced endless chains 174 and 176 (FIGS. 12–14) having a plurality of rotatable rollers 177 carried between the chains at even intervals. The chains are trained around pairs of sprockets 178, 180 and 182 which are keyed to shafts 184, 186 and 188, respectively. The shafts are journalled in bearings 190 secured to the plates 170 and 172.

The timing conveyor 30 is driven in timed relation with the reel 38 of the heat treatment apparatus 40 by a gear 192 which is secured to the shaft 196 of the reel 38 and meshes with a gear 194. The gear 194 is keyed to a shaft 198 that is journalled in bearings 199 (FIG. 12) supported by the heat treatment apparatus 40. A chain drive 200 interconnects the shaft 198 with the shaft 188 and drives the feed conveyor at a speed which will deposit the capsules 28 one at a time into the elongated carrier bars 36 (FIG. 1) formed on the periphery of the reel 38 in the heat treatment apparatus 40 as disclosed in the above mentioned patent to Wilbur No. 2,536,115.

As indicated in FIG. 1, when the capsules 28 are discharged from the opening 168 they will roll down the inclined support plate 167 into abutting contact with each other. As they roll down the plate, each capsule will be engaged and conveyed, one at a time, away from the following capsules in a predetermined spaced and timed arrangement. The timing conveyor 30 moves the capsules upwardly past the reject mechanism 32 and the let-down fingers 34 prior to discharging the capsules into the carrier bars 36 of the apparatus 40.

The reject mechanism 32 (FIGS. 1, 13 and 14) is provided to discharge incomplete capsules, that is, a carrier 26 without a mating cartridge 24 or a cartridge without a mating carrier, from the timing conveyor 30 prior to entering the heat treatment apparatus 40. The reject mechanism 32 comprises a pair of upwardly inclined support rails 204 and 206 (FIG. 14) which are spaced apart a distance slightly less than the length of the carrier. The support rails 204 and 206 are supported by the mounting plates 170 and 172, respectively. In order to maintain properly assembled capsules 28 centered and supported by the rails 204 and 206, guide rails 210 and 212 (FIG. 14) are mounted above the upwardly inclined run of the chain conveyor 30 in position to engage the upper portions of the end faces of the cartridges 24 and carriers 26, respectively. The guide rails 210 and 212 are likewise connected to the vertical mounting plates 170 and 172, respectively, by suitable brackets 214. A leaf spring 216 has one end bolted to a bracket 218 that is supported by the rail 212, and has its other end projecting through a slot in the rail 212 into the path of movement of the capsules 28 as they move over the rails 204 and 206 of the reject mechanism 32.

As clearly shown in FIG. 14, the spring 216 forces the capsule 28 to the left so that the cartridge of each assembled capsule engages the guide rail 210 and remains supported by the support rails 204 and 206, while the open end of a carrier 26 without a mating cartridge 24, or the end plate of a cartridge without the mating carrier will engage the rail 210, causing the foreshortened unit to fall downwardly between the supporting rails 204 and 206 and be rejected from the timing conveyor 30.

The properly formed capsules 28, after moving past the reject mechanism 32, are moved upwardly along support rails 220 and 222 (FIG. 13). The rails 220 and 222 define extensions of the rails 204 and 206 but are spaced closer together. Upon reaching the upper discharge end of the timing conveyor 30, the capsules roll over the let-down fingers 34 which are integral with and form extensions of the rails 220 and 222. The let-down fingers 34 (FIG. 1) project within the heat treatment apparatus 40 and into slots (not shown) formed in the carrier bars 36 of the reel 38. Thus, the let-down fingers 34 serve to gently lower the filled capsules 28 into the carrier bars 36 thereby greatly minimizing mechanical shock to the jars within the capsules 28.

The drive for the screw conveyor 82, the transfer turret 102, and the combiner reel 130 is best shown in FIGURES 1, 4, 5 and 6. The drive comprises a variable speed gear motor 226 having an output shaft 227 that is connected by a chain drive 229 to a slip clutch 230 of the type marketed by the Mercury Clutch Division of Automatic Steel Products, Inc., Canton, Ohio, under Model No. AC-4868. The slip clutch 230 is mounted on and drives a shaft 232 which is journalled in the frame 88 and has a bevel gear 234 (FIG. 5) keyed thereon. The bevel gear 234 meshes with a mating gear 236 that is keyed to one end of a shaft 238 that is suitably journalled in the frame 88 of the machine. A sprocket 240 is keyed to the other end of the shaft 238. The screw conveyor 82 is driven by a chain 241 which is trained around the sprocket 240, around a sprocket 242 keyed to the drive shaft 244 of the screw conveyor 82, and around a take-up sprocket 246 that is journalled on a bracket 248 adjustably mounted to the frame 88 of the capsule loader 22.

The transfer turret 102 is driven from a gear 250 which is keyed to the shaft 232 and meshes with a larger gear 252 that is keyed to one end of an intermediate shaft 254. A bevel gear 256 (FIG. 4) keyed to the other end of the intermediate shaft 254 meshes with a bevel gear 258 keyed to the lower end of the turret shaft 106.

The combiner reel 130 is driven from the gear 252 which meshes with a larger diameter gear 260 which is keyed to the reel shaft 132. The direction of rotation of the screw conveyor 82, the transfer turret 102 and the combiner reel 130 is indicated by arrows in FIGURES 1, 4 and 5.

Although the operation of the apparatus of the present invention has been included with the description of the several components, a brief resume of the operation will follow.

Filled and sealed jars J to be processed are advanced by the conveyor 70 (FIG. 1) into engagement with the screw conveyor 82 which singulates and spaces the jars J a predetermined distance from each other before feeding the jars one at a time into the pockets 104 of the inclined transfer turret 102. The transfer turret 102 shifts the jars from a position wherein their longitudinal axes are vertical to a position wherein the axes are horizontal at which time the jars are moved above a stripper plate 120 (FIG. 6) and between carrier bars 136 of the reel 130 of the capsule loader 22. Empty cartridges 24 (FIGS. 2 and 4) and carriers 26, which have previously been fed between the bars 136 of the capsule loader 22, are disposed on opposite sides of the jars and are telescopically cammed over the jars thereby defining capsules 28 (FIGS. 7 and 7A) as the reel 130 advances the jars J, cartridges 24 and carriers 26 upwardly within the drum 118 of the loader 22.

The capsules 28, each carrying an individual jar J, are then discharged from the drum 118 and are moved into the free roller timing conveyor 30 (FIG. 1), which conveyor advances the capsules over the reject mechanism 32 (FIG. 14) which discharges all incomplete capsules from the system. The capsules 28 are then advanced into the carrier bars 36 (FIG. 1) of the reel 38 of the heat treatment apparatus 40 after moving over the let-down fingers 34 which gently place the capsules 28 into the bars 36 thereby minimizing mechanical shock during transfer.

From the foregoing description it is apparent that the encapsulating and loading apparatus of the present invention includes a continuous capsule loader arranged to independently receive and align a cartridge, a carrier and an article and to thereafter move the cartridge and carrier into telescoping engagement with the article encapsulated therein. The apparatus also includes improved means for spacing jars supported on one end and for shifting the jars so that their longitudinal axes are moved from a vertical to a horizontal position before the jars are moved into alignment with the cartridges and carriers.

The apparatus further features a reject mechanism for rejecting improperly formed capsules from the system prior to reaching carrier bars of the heat treatment apparatus, and features let-down fingers which gently lower properly formed capsules into the carrier bars of the heat treatment apparatus.

While one embodiment of the present invention has been shown and described, it will be understood that other changes and modifications may be made therein without departing from the spirit of the invention or the scope of the appended claims.

Having thus described the present invention and the manner in which the same is to be used, what is claimed as new and desired to be protected by Letters Patent is:

1. An apparatus for encapsulating and processing an article in a reusable capsule which includes a tubular cartridge having one end closed to article passage and the other end open to accommodate the article and a tubular carrier having one end closed to article passage and to the other end open to telescopically receive the cartridge and article comprising: a heat treatment apparatus, a and having capsule accommodating pockets therein, means for supporting the cartridge, the carrier, and the article with their longitudinal axes substantially aligned and with the article disposed between the cartridge and the carrier adjacent their open ends; means for moving the cartridge and carrier together in telescoping engagement to define a capsule with an article encapsulated therein and means for lowering the properly formed capsule into a pocket of the reel of the heat treatment apparatus in timed relation with the movement of the reel.

2. An apparatus for encapsulating a container in a reusable capsule which includes a tubular cartridge having one end closed to container passage and the other end open to accommodate the container, and a tubular carrier having one end closed to container passage and the other end open to telescopically receive the cartridge and container comprising: means defining an elongate guide track for slidably supporting the cartridge, the carrier and the container for movement along said track and with the container disposed between the cartridge and the carrier adjacent the open ends thereof; means for moving the guide track along an arcuate path, a pair of curved cam tracks adjacent said arcuate path for engaging the closed ends of the cartridge and the carrier for slidably moving the cartridge and carrier a distance in excess of their lengths toward each other and into telescoping engagement to define a capsule with a container encapsulated therein; and means on said guide track responsive to the slidable movement of the carrier along said guide track for effecting transverse shifting of the carrier relative to the cartridge during sliding movement thereof toward said cartridge to assure unobstructed entry of the cartridge into the carrier.

3. An apparatus for encapsulating a container in a capsule which includes a tubular cartridge having one end open to accommodate a container and a tubular carrier having one end open to telescopically receive the cartridge and container comprising: a continuously driven reel; means defining an elongated guide track secured to said reel for slidably supporting the cartridge, the carrier, and the container for movement along said track and with the container being disposed between the cartridge and the carrier adjacent to the open ends thereof; a housing surrounding said reel for retaining the cartridge, carrier and container in said track; a first cam secured to said housing for engaging and moving the carrier into telescoping engagement with the container; and a second cam secured to said housing for engaging and moving the cartridge into telescoping engagement with the carrier thereby encapsulating the container.

4. An apparatus for encapsulating a container in a capsule which includes a tubular cartridge having one end open to accommodate a container and a tubular carrier having one end open to telescopically receive the cartridge and container comprising: a continuously driven reel; means defining an elongated track secured to and extending transversely of said reel for slidably supporting the cartridge, the carrier and the container for movement along said track and with the container being disposed between the cartridge and the carrier adjacent the open ends thereof; a housing surrounding said reel for retaining the cartridge, the carrier, and the container therein; said housing having cartridge, carrier and container inlet openings and having a capsule discharge opening therein; means for simultaneously directing the cartridge and carrier through the cartridge and carrier inlet openings and into said track moving therebelow; container transfer means for receiving a container while in an upright position and for shifting the container to a horizontal position before directing the container through the container inlet opening for reception in said track; a first cam track secured to said housing for engaging and moving the carrier into telescoping engagement with the container; and a second cam track secured to said housing for engaging and moving the cartridge into telescoping engagement with the carrier thereby encapsulating the container; said cam tracks thereafter moving the capsule into alignment with the capsule discharge opening for gravitational discharge from said housing.

5. A capsule loading apparatus for encapsulating a container in a capsule and for loading the capsule into the pockets of a continuously rotating reel of a treatment apparatus, said capsule including a tubular cartridge having one end open to accommodate the container and a tubular carrier having one end open to telescopically receive the cartridge and container comprising: container conveying means for supporting a row of containers on one end with their longitudinal axes upright and for advancing the row of containers along a predetermined path; means for spacing said containers while moving along said path; a transfer turret mounted for rotation about an inclined axis for receiving each container from said container advancing means and for shifting each container to a position wherein its axis is horizontal; a combining reel disposed adjacent said transfer turret; means defining a plurality of elongated capsule forming tracks secured to the periphery of said combining reel and each track adapted to receive a container from said turret adjacent the longitudinal midpoint thereof; a housing disposed around said combining reel and having a container inlet opening, a capsule inlet opening, a cartridge inlet opening and a capsule outlet opening therein; said housing cooperating with said capsule forming tracks to aid in stripping the containers from said transfer turret and to retain said containers in said capsule forming track until advanced to said capsule discharge opening; means for directing a cartridge through said cartridge inlet opening into each of said capsule forming tracks on one side of the container therein, means for directing a carrier through said carrier inlet opening into each of said capsule forming tracks on the other side of the container therein; stationary cam means secured to said housing for contacting and camming the cartridges and carriers into telescoping engagement with each other and with the associated containers to form capsules with containers encapsulated therein; capsule conveying means for receiving the capsules from said capsule discharge opening and for advancing the capsules along a predetermined path; means intermediate to said path for effecting the discharge of improperly formed capsules from the path; means at the discharge end of said path for gently lowering the properly formed capsules into the pockets of the reel of the treatment apparatus; and means for driving said container conveying means, said spacing means, said transfer turret, said combining reel, and said capsule conveying means in timed relation with the movement of the reel of the treatment apparatus.

6. An apparatus according to claim 4 and additionally comprising a device for spacing containers a predetermined distance from each other and for moving the containers into said container transfer means; said device including a driven endless conveyor for supporting the containers and moving them along a predetermined path, a driven screw conveyor extending parallel to said endless conveyor in position to engage a side of each container and having a helical thread defining ridges and valleys on its outer surface, said thread having a pitch which increased in the direction of movement of the containers, and resilient means extending parallel to said endless conveyor and engaging the other sides of the contains to urge said containers against said screw conveyor, said resilient means adapted to deflect outwardly in the event a container becomes positioned opposite a ridge of said helical thread rather than opposite a valley of said thread.

7. An apparatus according to claim 6 wherein said resilient means is a helical spring which frictionally engages said other side of the containers, said helical spring adapted to frictionally engage and resist forward movement of a container while deflecting outwardly in the event said container becomes positioned opposite a ridge of said helical thread rather than opposite the valley of the thread.

8. An apparatus according to claim 4 wherein said container transfer means comprises conveying means for moving spaced containers having their longitudinal axes vertical to a pickup position, a continuously driven inclined shaft journaled adjacent said conveying means, a wheel secured to said shaft and having a plurality of equally spaced fingers defining pockets in the periphery thereof, each of said pockets including a wide lower section for engaging a tall container adjacent the lower end thereof and having an upper section spaced from said lower section to engage a tall container near its upper end whereby rotation of said wheel effects a movement of the containers from the pickup to a discharge position and effects shifting of said axes from the vertical to horizontal positions, and stationary guide means for retaining the containers in said pockets when the containers are being moved between said pickup and discharge positions, said wide lower pocket section being of sufficient width to maintain the axis of short containers horizontal when the containers are at said discharge position without the aid of said upper pocket section.

9. An apparatus for encapsulating and processing a glass container in a reusable capsule which includes a tubular cartridge one end closed to container passage and the other end open to accommodate the container, and a tubular carrier having one end closed to container passage and the other end open to telescopically receive the cartridge and container comprising; a source of singulated end oriented cartridges, a source of singulated end oriented carriers, a source of glass containers ready to be processed, means for removing from said sources and for aligning separate cartridges and carriers along their major axes with their open ends facing and with a glass container therebetween, encapsulating means for moving the cartridge and carrier together in telescoping engagement to define a capsule with a glass container encapsulated therein, a heat treatment apparatus adjacent said encapsulating means, a continuously driven reel in said heat treatment apparatus and having capsule accommodating pockets therein, and means for lowering the properly formed capsules into a pocket of the reel of said heat treatment apparatus in timed relation with the movement of the reel.

References Cited
UNITED STATES PATENTS

| | | | |
|---|---|---|---|
| 2,361,783 | 10/1944 | McLaughlin | 53—252 XR |
| 3,036,581 | 5/1962 | Dearsley. | |
| 3,054,167 | 9/1962 | Bryner et al. | 29—203.8 |

WILLIAM W. DYER, Jr., *Primary Examiner.*

R. ALVEY, *Assistant Examiner.*

UNITED STATES PATENT OFFICE
CERTIFICATE OF CORRECTION

Patent No. 3,388,528                                June 18, 1968

Milton L. Croall et al.

It is certified that error appears in the above identified patent and that said Letters Patent are hereby corrected as shown below:

Column 8, line 60, after "and" cancel "to"; line 62, after "a", second occurrence, insert -- continuously driven reel in said heat treatment apparatus --.

Signed and sealed this 24th day of February 1970.

(SEAL)
Attest:

Edward M. Fletcher, Jr.                          WILLIAM E. SCHUYLER, JR.
Attesting Officer                                      Commissioner of Patents